United States Patent
Kamentser et al.

[11] Patent Number: 5,835,977
[45] Date of Patent: Nov. 10, 1998

[54] FORCE TRANSDUCER WITH CO-PLANAR STRAIN GAUGES

[76] Inventors: Boris Kamentser, 552 Smoke Tree Ave., Fountain Valley, Calif. 92708; Eugenia Kamentser, 11891 Tunstall Ave., Garden Grove, Calif. 92645

[21] Appl. No.: 697,062

[22] Filed: Aug. 19, 1996

[51] Int. Cl.⁶ .................................................... G01L 5/22
[52] U.S. Cl. .................... 73/862.05; 73/862.044
[58] Field of Search ...................... 73/862.041, 862.042, 73/862.043, 862.044, 862.045, 862.05

[56] References Cited

U.S. PATENT DOCUMENTS

| | | | |
|---|---|---|---|
| Re. 26,302 | 11/1967 | Seed et al. | 73/862.622 |
| 3,729,990 | 5/1973 | Oliver | 73/862.95 |
| 4,217,569 | 8/1980 | Nejedly et al. | 73/862.05 X |
| 4,454,771 | 6/1984 | Shimazoe et al. | 73/862.632 X |
| 4,493,219 | 1/1985 | Sharp et al. | 73/862.05 |
| 4,536,746 | 8/1985 | Gobeli | 73/862.05 X |
| 4,635,479 | 1/1987 | Salisbury, Jr. et al. | 73/862.044 X |
| 4,758,692 | 7/1988 | Roeser et al. | 73/862.05 X |
| 5,035,148 | 7/1991 | Okada | 73/862.044 |
| 5,228,348 | 7/1993 | Frigiere | 73/862.05 |
| 5,526,700 | 6/1996 | Akeel | 73/862.043 |

*Primary Examiner*—Elizabeth L. Dougherty
*Attorney, Agent, or Firm*—Leonard Tachner

[57] ABSTRACT

An improved force transducer which may, for example, be used as a joystick control for computer display control. Co-planar strain gauges are configured for response to forces applied in each of three orthogonal directions. A post and underlying ceramic substrate, the latter having the strain gauges mounted thereon, are mounted to a printed circuit board by means of a conductive epoxy or solder in a gap between the substrate and the circuit board. A retainer may be used to limit the extent of post displacement in X and Y directions to prevent damage to the assembly from forces which would otherwise exceed the physical limits thereof.

2 Claims, 6 Drawing Sheets

FORCE TRANSDUCER WITH CO-PLANAR STRAIN GAUGES

BACKGROUND OF THE INVENTION

1. FIELD OF THE INVENTION

This invention relates generally to force transducers and more particularly, to resistive strain gauge force transducers for actuators.

2. PRIOR ART

Force transducers convert external forces applied to an actuator by a user into corresponding electrical signals that are used to control a device or position an object of a display. The external forces are converted into electrical signals that represent force components along orthogonal axes. For example, a joystick-type display controller for a computer includes a force transducer that converts forces applied to the joystick into two signals, one signal representing the component of force along an X axis and a second signal representing the component of force along a Y axis that is orthogonal to the X axis. The relative magnitude of the X and Y signals represent the relative amount of display pointer movement along the X and Y axis desired by the user. A computer to which the display controller is attached receives the electrical signals and moves the display pointer accordingly. The force transducer is provided with electrical power to produce electrical signals representing the force components as the external force is applied.

The joystick-type display controller described above can include a force transducer comprising a lever arm that is mechanically coupled to a support base by an articulated joint. While the force transducer provides the needed force component electrical signals, the mechanical linkage needed to permit movement of the joystick in the desired directions is complex. In particular, the mechanical linkage is relatively large, bulky and expensive. Also, the mechanical linkage is subject to wear and reliability problems.

As an alternative to the joystick force transducer with a mechanical linkage, force transducers have been developed with thin film resistive strain gauges. A thin film resistive strain gauge uses a conductive, thin film resistive strain gauge material that is deposited onto a thin, flexible substrate using photolithographic fabrication techniques. The strain gauge material undergoes a change in electrical resistivity when the underlying substrate is subjected to strain. If an electrical current is passed through the strain gauge material, the change in resistivity can be detected by an output voltage change and the relative amount of strain can be measured. The substrate is bonded onto the sides of the lever arm so that the substrate undergoes strain when forces are applied to the lever arm.

For example, some laptop computers are provided with a display controller force transducer comprising a pointer actuator that extends upwardly from between keys of the computer keyboard. The lever arm includes the thin film strain gauges described above. As forces are applied to the lever arm, the strain is detected and is used to control a display pointer. This permits a user to control the associated display pointer without removing his or her hands from the keyboard. The user's hands otherwise would need to move from the keyboard to manipulate, for example a display mouse controller or joystick controller.

The force transducer using thin film resistive strain gauge technology represents a valuable advance over mechanical linkage force transducers. The thin film force transducer is much smaller and lighter than the mechanical linkage and therefore is ideally suited to installation in tight spaces, such as beneath the keyboard of a laptop computer. Moreover, the thin film force transducer contains no moving parts. Thus, the wear and reliability problems of the mechanical linkage are virtually eliminated. Unfortunately, the thin film resistive strain gauges produce output signals with a relatively low signal-to-noise ratio. The electrical environment within a laptop computer includes many different sources of electrical and magnetic interference that make processing the force transducer output signals difficult. In addition, the thin film resistive strain gauges are relatively expensive to produce.

Therefore, there is a need for a force transducer that is sufficiently small to be suitable for use in tight spaces such as computer keyboards, which provides improved signal-to-noise characteristics for easier signal processing, is reliable for improved performance and greater service life, and can be produced at a competitive cost.

In a prior invention of which the present applicant is a co-inventor, a force transducer includes an elongated lever arm or post attached to a substrate having strain gauges constructed from thick film resistive strain gauge material. The thick film strain gauge material is deposited directly onto the substrate using thick film screen printing techniques, which are much less expensive than thin film photolithographic techniques. The thick film strain gauges provide a force transducer that is much smaller than a mechanical transducer, has better reliability, can be produced for less cost than thin film force transducers, and which provides output signals with higher signal-to-noise ratios.

The post has a fixed end and a free end to which an external force is applied. The substrate includes a central portion at which the fixed end of the post is attached and substantially planar tab regions that project outwardly from the central portion along first and second orthogonal force-detecting axes so that the substrate undergoes localized strain approximately at the junctions of the tab regions and the central portion when the external force is applied to the free end of the post. As noted above, the thick film strain gauge material is printed directly onto the substrate. Such monolithic construction provides a force transducer that is much easier to produce than the thin film photolithographic technology commonly used.

In one aspect of that prior invention, the thick film resistive strain gauge material is printed in first and second locations such that the strain gauge material at each location bridges the central portion and a tab region across a respective tab region-central portion junction of localized strain. The force transducer includes conductive pads on the substrate that are electrically coupled to the thick film strain gauge material at each location to define a first strain gauge having an electrical-path through the first location oriented along the first force detecting axis and a second strain gauge having an electrical path through the second location oriented along the second force detecting axis.

In that prior invention, the substrate may comprise a substantially planar material having a top surface and a bottom surface, and the strain gauge material may be deposited on both the top surface and bottom surface. Combining the electrical signals from the top strain gauges and the bottom strain gauges cancels out temperature effects and improves the signal-to-noise ratio of the output signal.

Although the aforementioned prior invention solves many of the noted deficiencies of the prior art, there are certain additional features which would be highly advantageous but which are simply not found in the prior invention. For example, it would be very useful to provide a capability to measure force in a third orthogonal direction such as in a vertical direction. Furthermore, it would be useful to provide more convenient structural implementations such as easier methods of integrating a sensor and a support plate to produce a transducer. In addition, given the tendency of a user to apply extremely high forces to a joystick controller or of a robot to apply high forces through a robotic position or shape sensor, there would be advantages to protecting the transducer from being overly stressed. Furthermore, it would be highly advantageous to provide a fabrication scheme which made the gauges less sensitive to surface irregularities which may be incurred during installation and which otherwise render transducer parameters less repeatable from unit to unit. It will be seen hereinafter that the present invention provides all of these additional capabilities.

SUMMARY OF THE INVENTION

The present invention comprises a force transducer having a plurality of planar strain gauges formed of thick film material, a post for receiving a force to be sensed and a planar substrate for receiving the strain gauges and for supporting the post; the transducer providing sufficient sensors configured for measuring at least three orthogonal forces such as left/right and up/down in a horizontal plane and in/out in a vertical plane. In one embodiment the invention comprises four strain gauges located on a common surface of the substrate and in another embodiment the invention comprises eight strain gauges on a common surface of the substrate. The invention also comprises the use of conductive adhesive, such as epoxy or solder, for affixing the planar substrate to an underlying printed circuit board while leaving an appropriate gap therebetween to permit some deflection of the substrate in response to forces applied to the post. In still another embodiment, the present invention provides a retainer for surrounding and limiting the displacement of the post upon over-stressing which could otherwise cause permanent damage to the transducer.

OBJECTS OF THE INVENTION

It is therefore a principal object of the invention to provide an improved thick film strain gauge force transducer which can be used to measure applied forces in three separate orthogonal directions.

It is another object of the invention to provide an improved thick film strain gauge force transducer which can be attached to a printed circuit board by a conductive adhesive or by a soldering technique called surface mount technology.

It is still another object of the invention to provide an improved thick film strain gauge force transducer which utilizes a retainer to limit the displacement of a post to which the forces to be measured are applied, thus preventing permanent damage to the transducer.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF PREFERRED EMBODIMENTS

Figure 1:
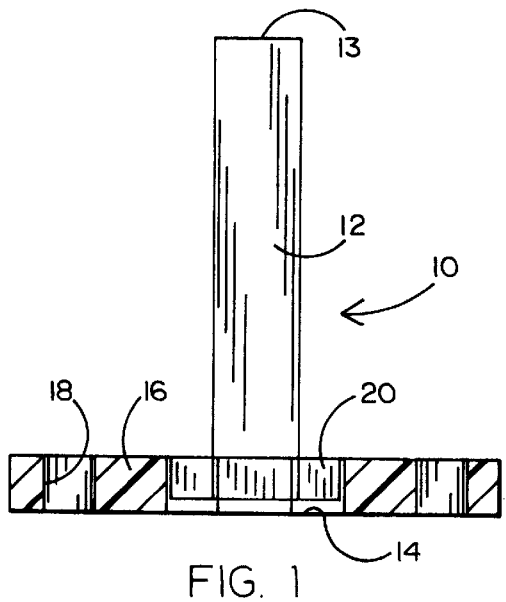
FIG. 1 is a front view of a four-sensor post/plate transducer.

Referring now to the accompanying drawings, it will be seen that a sensor assembly 10, in accordance with a first embodiment of the invention, comprises a post 12 having a free end 13 and terminating at the remaining end in a rectangular thin plate 14. Plate 14 may preferably have a reinforced structure 16 of greater thickness at its periphery to facilitate attachment of the sensor to exterior structures and to decrease the influence of variations due to manufacturing tolerances on sensor output. Holes 18 are provided to enable attachment of the sensor 10 to other structures such as a mechanical housing or the like. Holes 20 adjacent the post 12, are provided to increase stress concentration in the strain gauges, the latter being positioned at strain gauge locations 22 seen in FIG. 2. Those portions of the plate 14 not used to position the strain gauges may be used to position support electronics (not shown) such as amplifiers and the like.

Figure 2:
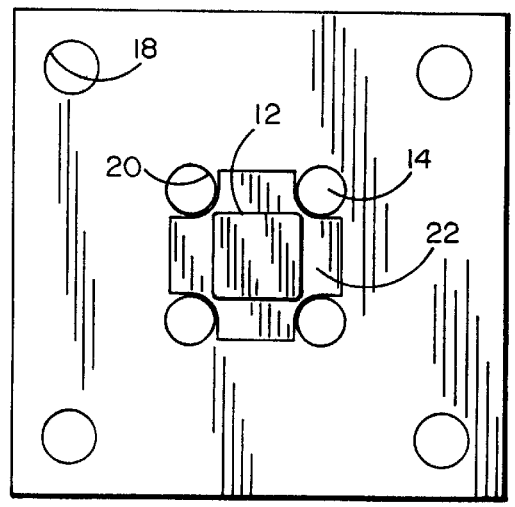
FIG. 2 is a top view of the transducer of FIG. 1.
Figure 3:
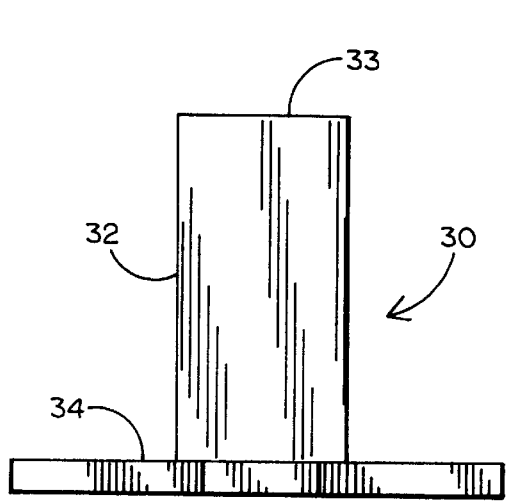
FIG. 3 is a front view of an alternative four-sensor transducer configuration.
Figure 4:
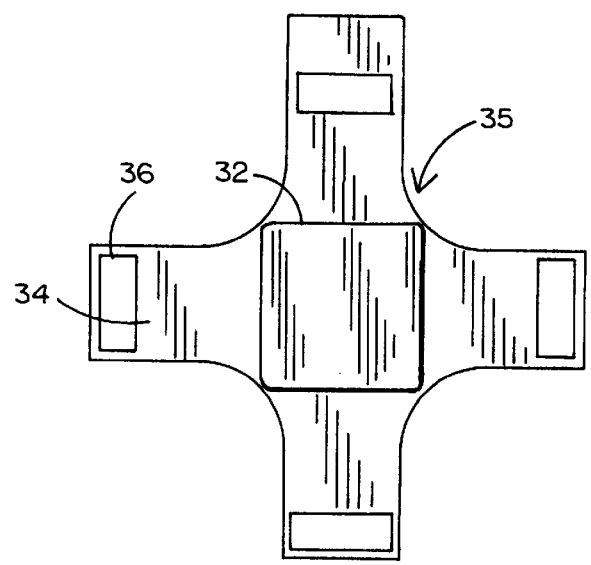
FIG. 4 is a top view of the transducer of FIG. 3.
Figure 5:
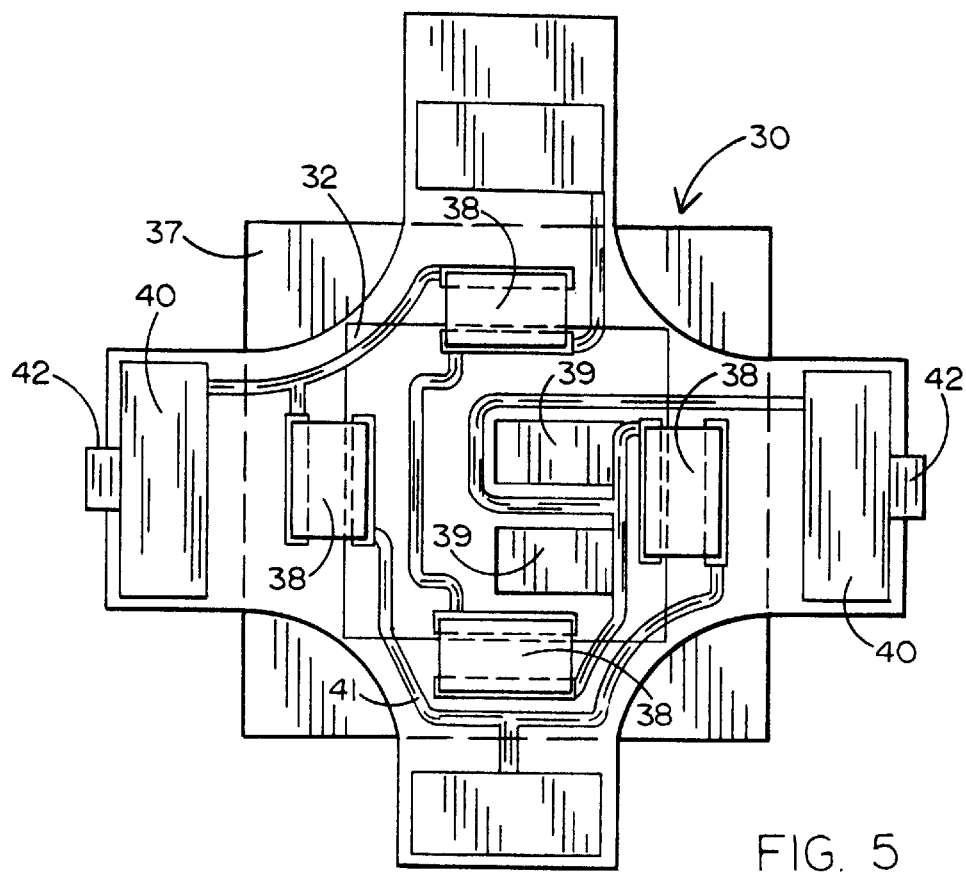
FIG. 5 is a layout drawing of the transducer of FIG. 3.

The general configuration of a sensor assembly shown in FIGS. 1 and 2, may be provided in various forms depending upon the intended use and cost and manufacturing constraints. By way of example, a relatively simple, low cost version of the invention is depicted in the embodiments of FIGS. 3, 4 and 5. More specifically, a sensor assembly 30 comprises a post 32 and a plate 34, the latter having cutouts 35 and electrical connection pads 36. As seen best in FIG. 5, four strain gauges 38 are positioned on plate 34 immediately adjacent post 32 to best react to forces applied to a free end 33 of post 32. A plurality of electrical pads 40 connect to at least two solder paths 42 to provide connection to +V and ground. One or more resistors 39 may be also configured on the plate 34 as thick film devices for trimming and calibration purposes. The internal connections between strain gauges 38, resistors 39 and electrical pads 40 may be obtained using solder paths 41 as shown in FIG. 5. Cutouts 35 decrease the structural resistance of plate 34 to induced strain resulting from forces being applied to the free end 33 of post 32. Solder paths 42 provide connections to external devices including a voltage source and electrical ground. A silicone or polyamide protective coating 37 may be used to cover the strain gauges, resistances and solder paths.

Figure 6:
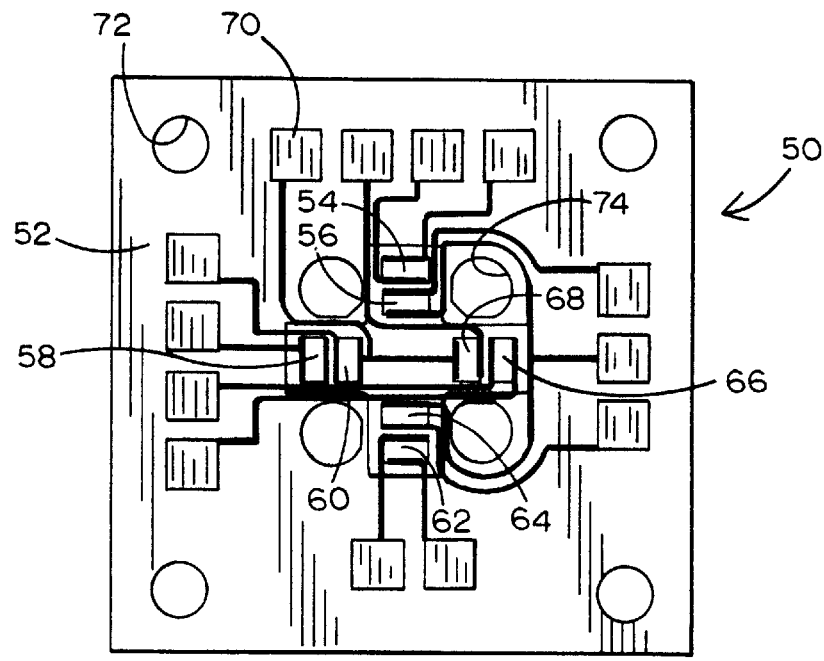
FIG. 6 is a layout drawing of an eight-sensor transducer version of the invention.

An eight-gauge version of the sensor of the present invention is shown in FIG. 6. A sensor array 50 comprises a ceramic substrate on which are located strain gauges 54, 56, 58, 60, 62, 64, 66 and 68. Basically each single gauge 38 of the embodiment of FIG. 5 is replaced by two gauges in the embodiment of FIG. 6, but with each such gauge connected to a corresponding pair of electrical pads 70. Holes 72 provide attachment means while holes 74 relieve structural resistance adjacent the gauges.

Figure 7:
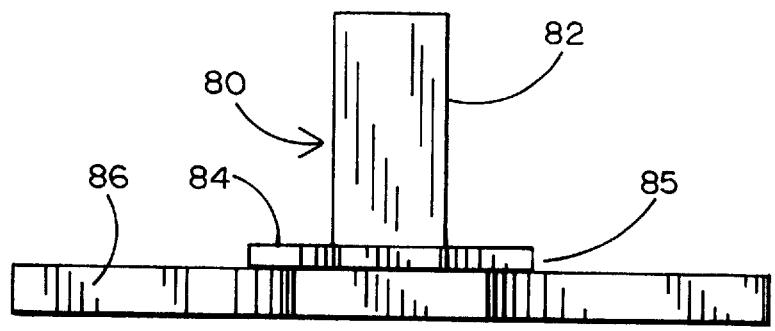
FIGS. 7 and 8 together illustrate a surface mount version of the invention.
Figure 8:
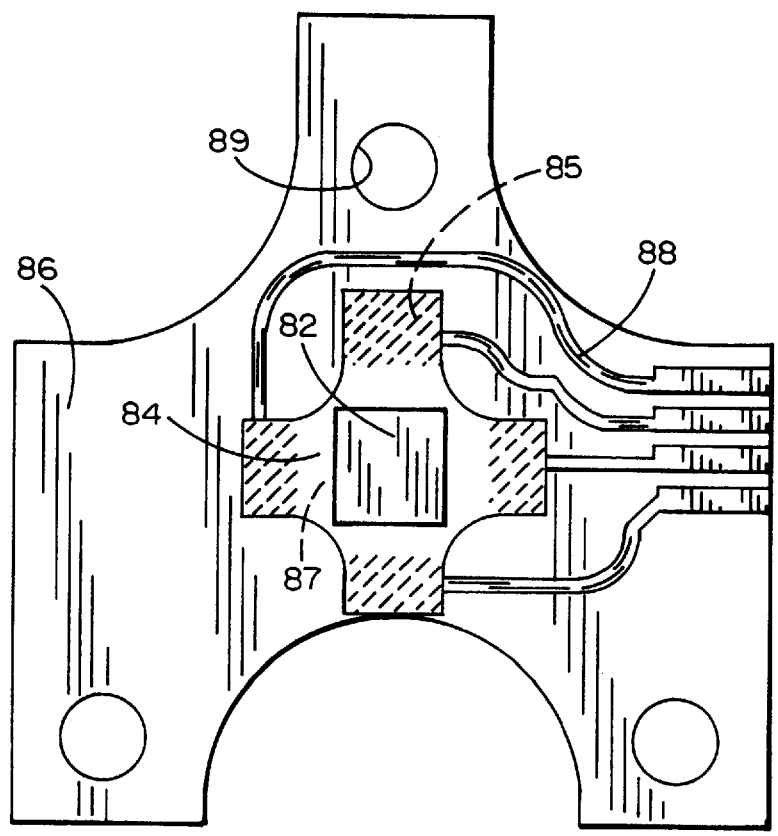

One of the unique features of the present invention is in the manner in which the sensor assembly may be secured to a printed board. As shown in FIGS. 7 and 8, a sensor assembly 80 is secured to a printed circuit board 86 by a layer 85 of conductive adhesive or solder. The assembly 80 comprises the post 82 and a ceramic substrate plate 84 such as the assembly configuration of FIGS. 3–5. The conductive layer 85 of adhesive or solder serves several purposes. First, it secures the assembly to the printed circuit board 86. Second, it provides electrical connection from the electrical pads of the assembly (such as pads 40 of FIG. 5) to conductive solder paths 88 on the printed circuit board. Third, since the layer 85 is preferably somewhat free-flowing (semi-viscous) in its uncured or high-temperature state, the layer acts as a stabilizing physical buffer which automatically compensates for any surface inaccuracies or irregularities in the ceramic substrate plate 84. Thus it is contemplated in the fabrication of the embodiment shown in FIGS. 7 and 8, that the substrate 84 will be applied to the circuit board 86 while the intermediate layer 85 of conductive adhesive or solder is still in at least a partially flowable condition and that the layer doesn't fully cure or harden until after the ceramic substrate has reached a stable and fully supported condition. In such a condition, the characteristics of the sensor assembly 80 will not be affected by variations in surface characteristics of either the substrate 84 or the circuit board 86, thus assuring consistent and repeatable sensing parameters from joystick to joystick. It will be seen in FIG. 8 that the adhesive 85 is applied along the peripher of the substrate 84 leaving a gap 87 beneath the post 82 and the area adjacent thereto. Gap 87 permits Z-axis force measurement by freeing the substrate relative to the circuit board below and near the post 82.

Figure 9:
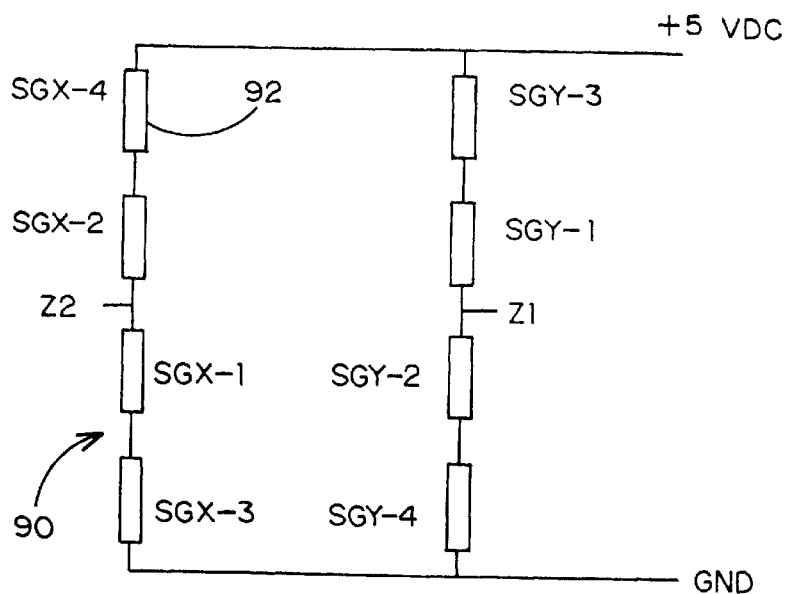
FIG. 9 is a schematic diagram of the eight sensor transducer configured for Z direction force measurement.
Figure 10:
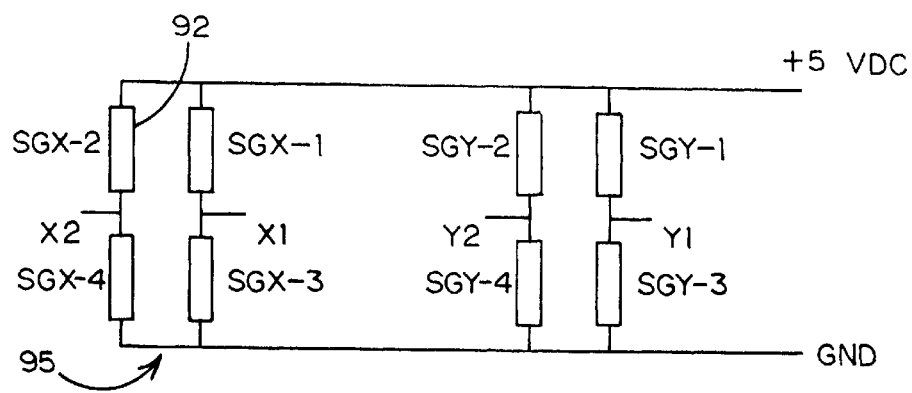
FIG. 10 is a schematic diagram of the eight sensor transducer configured for X-Y direction force measurement.

Another unique characteristic of the present invention is third axis or "Z-axis" force measurement capability. By way of example, for the eight-gauge configuration of FIG. 6, FIGS. 9 and 10 illustrate respective bridge configurations 90 and 95 for Z-axis and X and Y-axes, respectively. The strain gauges are configured in four wings. Wing 1 has two strain gauges SGX-1 and SGX-3 configured to produce opposite change in resistance when force is applied in the X-direction and similar charge in resistance when force is applied in the Z-direction. Wing 2 has two strain gauges SGX-2 and SGX-4 configured to produce opposite change in resistance when force is applied in the X-direction and similar change in resistance when force is applied in the X-direction. Wing 3 has two strain gauges SGY-1 and SGY-3 configured to produce opposite change in resistance when force is applied in the Y-direction and similar change in resistance when force is applied in the Z-direction. Wing 4 has two strain gauges SGY-2 and SGY-4 configured to produce opposite change in resistance when force is applied in the Y-direction and similar change in resistance when force is applied in the Z-direction.

The X-direction measurement has the wing 1 and wing 2 strain gauges forming a Wheatstone bridge. The wings are connected in a manner which shifts voltage in opposite directions between X1 and X2 of FIG. 10 when an X-direction force is applied.

The Y-direction measurement has the wing 3 and wing 4 strain gauges forming a Wheatstone bridge. The wings are connected in a manner which shifts voltage in opposite directions between Y1 and Y 2 of FIG. 10 when a Y-direction force is applied.

Figure 11:
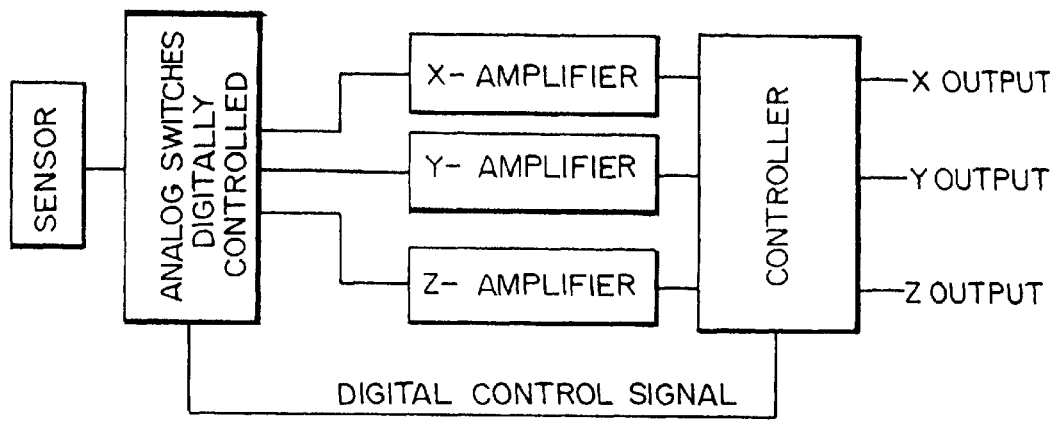
FIG. 11 is a schematic of electronics used with the invention to enable switching between the configurations of FIGS. 9 and 10.
Figure 12:
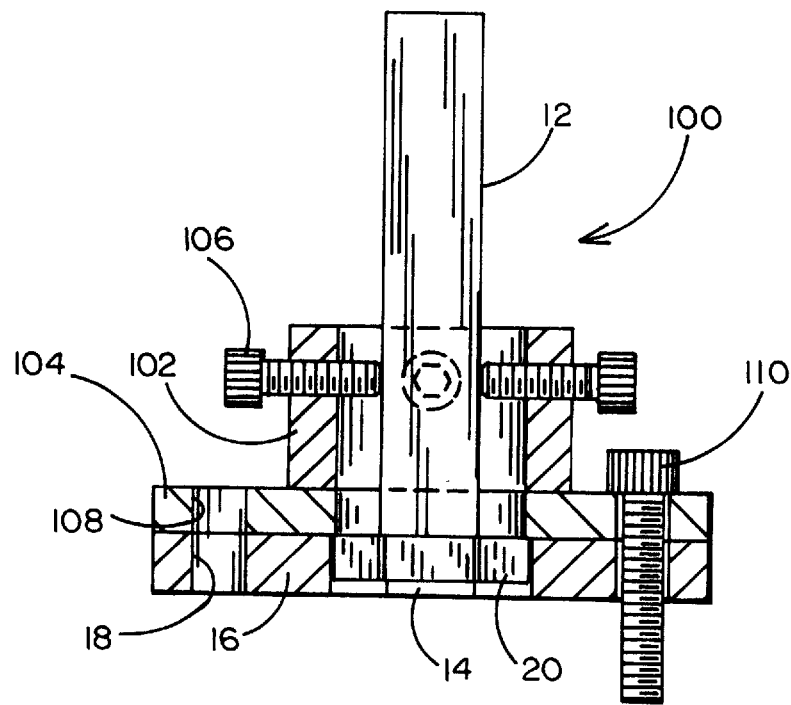
FIGS. 12–15 provide various views of a post-retainer for limiting displacement of a post used in the transducer of the invention.
Figure 13:
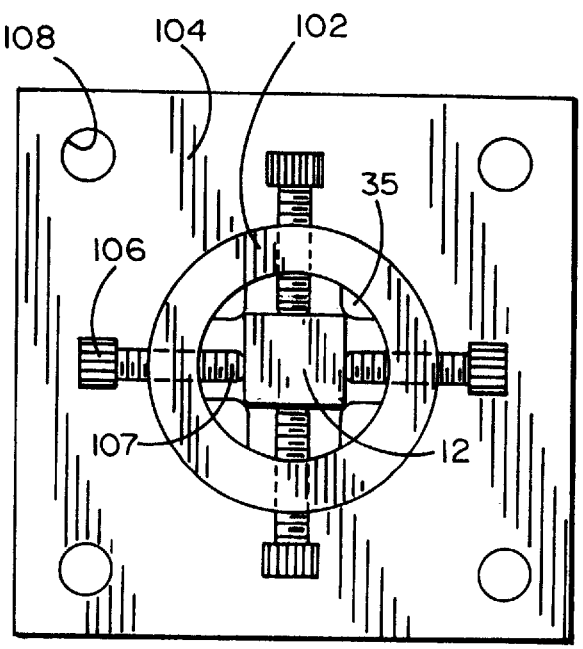
Figure 14:
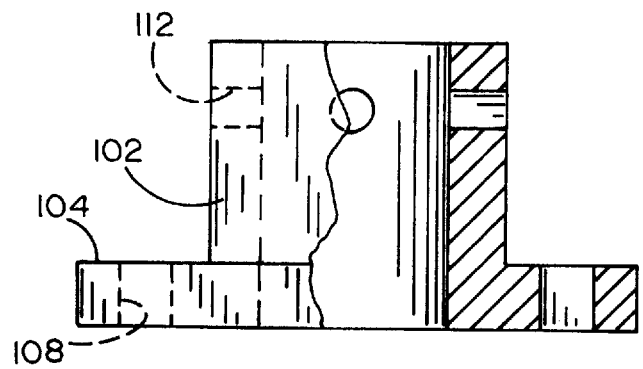
Figure 15:
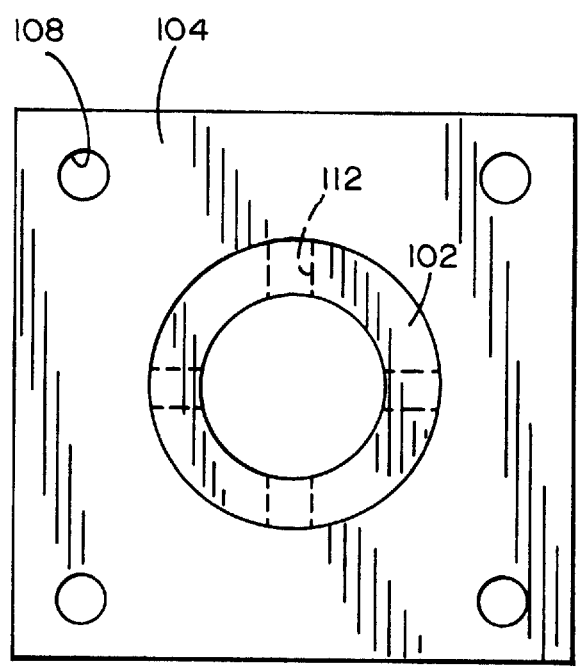

The Z-direction measurement requires reconfiguration to the circuit of FIG. 9. This configuration produces an opposite voltage shift between Z1 and Z2 when a Z-direction force is applied. In order to measure both in X-Y and in Z directions, the connection of the various strain gauges to +5 VDC and ground must be periodically altered. This may be accomplished by the digitally-controlled analog switches of the subsystem of FIG. 11 which also provides amplifiers for each axis measurement to provide appropriate signal magnitudes for even relatively small forces in each of the three directions X, Y and Z.

Referring now to FIGS. 12–15, it will be seen that a sensor assembly 100 adds to the assembly of FIG. 1 a post retainer 102, having a base 104 and a plurality of adjustable limit bolts 106. Base 104 provides a plurality of attachment holes 108 each for receiving a fastening bolt 110. The adjustable limit bolts 106 are threadably secured around post retainer 102 in respective threaded apertures 112 toward post 12 whereby to limit the lateral motion of the post in each of four directions, namely + and −X and + and −Y.

It will now be apparent that what has been disclosed herein comprises an improved force transducer which may, for example, be used as a joystick control for computer display control. The term "mounted" as it applies to the strain gauges on a substrate includes all forms of depositing strain gauges including physical placement, screen process printing and all forms of thin film deposition. Co-planar strain gauges are configured for response to forces applied in each of three orthogonal directions. A post and underlying ceramic substrate, the latter having the strain gauges mounted thereon, are mounted to a printed circuit board by means of a conductive epoxy or solder in a gap between the substrate and the circuit board. A retainer may be used to limit the extent of post displacement in X and Y directions to prevent damage to the assembly from forces which would otherwise exceed the physical limits thereof.

Those having skill in the art of such transducers, will as a result of the present disclosure, now perceive various additions and modifications which may be made to the invention. By way of example, the precise shape and configuration of the various components of the disclosed embodiments may be readily altered while still achieving the aforementioned objects of the invention. Accordingly, all such additions and modifications are deemed to be within the scope of the invention which is to be limited only by the appended claims and their equivalents.

I claim:

1. A force transducer for generating an electrical response dependent upon the magnitude and direction of an applied force, the transducer comprising:

a post and a substrate to which the post is affixed at a first end, a second end of said post being free;

a plurality of strain gauges each mounted on said substrate adjacent said post at a selected location and configured for changing resistance in response to a force applied to said post, said resistance changes among said strain gauges being dependent on the magnitude and direction of said force in each of three orthogonal directions; and wherein said three orthogonal directions include two directions in a first plane and a third direction in a second plane and wherein at least some of said plurality of strain gauges measure forces applied to said post in said first plane during a first period of time and measure forces applied to said post in said first plane during a first period of time and measure forces applied to said post in said second plane during a second period of time; said transducer further comprising switches for configuring said strain gauges in a first configuration during said first period of time and in a second configuration during said second period of time and alternatively switching between said first and second configurations thereafter.

2. A force transducer for generating an electrical response dependent upon the magnitude and direction of an applied force, the transducer comprising:

a post and a substrate to which the post is affixed at a first end, a second end of said post being free; and a plurality of strain gauges each mounted on said substrate adjacent said post at a selected location and configured for changing resistance in response to a force applied to said post, said resistance changes among said strain gauges being dependent on the magnitude and direction of said force;

a printed circuit board, said substrate being affixed to said printed circuit board by a conductive material while said conductive material is semi-viscous, said conductive material being hardened thereafter; and wherein said conductive material being configured to leave a gap beneath said substrate adjacent said post.

\* \* \* \* \*